United States Patent [19]

Dolle et al.

[11] Patent Number: 5,700,896

[45] Date of Patent: Dec. 23, 1997

[54] POLYMER HAVING LONG ISOTACTIC SEQUENCES AND RANDOMLY-DISTRIBUTED ETHYLENE CONTENT OBTAINED BY POLYMERIZING PROPYLENE IN PRESENCE OF SPECIFIC CATALYSTS

[75] Inventors: Volker Dolle, Beneheim; Jürgen Rohrmann, Kelkheim; Andreas Winter, Glashutten; Martin Antberg, Hofheim am Taunus, all of Germany

[73] Assignee: Hoechst Aktiengesellschaft, Frankfurt, Germany

[21] Appl. No.: 480,542

[22] Filed: Jun. 7, 1995

Related U.S. Application Data

[63] Continuation of Ser. No. 192,837, Feb. 7, 1994, abandoned, which is a continuation-in-part of Ser. No. 978,022, Nov. 18, 1992, abandoned, which is a continuation of Ser. No. 387,218, Jul. 28, 1989, abandoned.

[30] Foreign Application Priority Data

Jul. 30, 1988 [DE] Germany ............................ 38 26 074.3

[51] Int. Cl.$^6$ ................................................ C08F 10/06
[52] U.S. Cl. .................... 526/351; 526/348; 526/127; 526/160; 526/943; 525/240; 502/103; 502/117; 556/11
[58] Field of Search .................................... 526/127, 160, 526/348, 351; 525/240

[56] References Cited

U.S. PATENT DOCUMENTS

| | | | |
|---|---|---|---|
| 3,112,301 | 11/1963 | Natta et al. | 526/351 |
| 4,522,982 | 6/1985 | Ewen | 525/240 |
| 4,542,199 | 9/1985 | Kaminsky et al. | 526/160 |
| 4,769,510 | 9/1988 | Kaminsky et al. | 585/512 |
| 4,841,004 | 6/1989 | Kaminsky et al. | 526/160 |
| 4,849,487 | 7/1989 | Kaminsky et al. | 526/160 |
| 4,937,301 | 6/1990 | Chang | 526/128 |
| 5,017,714 | 5/1991 | Welborn, Jr. | 556/12 |
| 5,328,969 | 7/1994 | Winter et al. | 526/127 |

FOREIGN PATENT DOCUMENTS

| | | |
|---|---|---|
| 0069951 | 1/1983 | European Pat. Off. . |
| 0185918 | 7/1986 | European Pat. Off. . |
| 0269986 | 6/1988 | European Pat. Off. . |
| 0269987 | 6/1988 | European Pat. Off. . |
| 0302424 | 2/1989 | European Pat. Off. . |
| 0344887 | 12/1989 | European Pat. Off. . |
| 3726067 | 2/1989 | Germany . |
| 1222892 | 2/1971 | United Kingdom . |

*Primary Examiner*—Mark Nagumo
*Attorney, Agent, or Firm*—Connolly & Hutz

[57] ABSTRACT

Propylene isoblock polymers with 0.5 to 10 mol %, based on the total polymer, of randomly distributed ethylene content and with a narrow molecular weight distribution and rubber-like properties are obtained when propylene is polymerized using a catalyst comprising an aluminoxane and a chiral metallocene, containing bridges, of formula I:

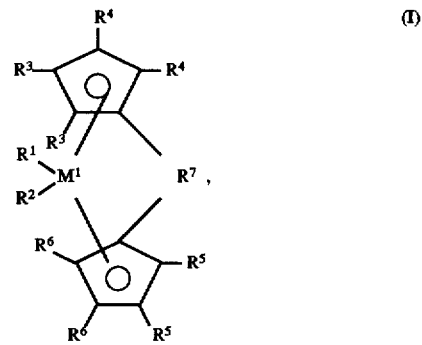

in which $M^1$ is preferably hafnium or zirconium, $R^1$ and $R^2$ are preferably halogen (e.g. Cl) atoms, $R_3$ through $R^6$ are hydrogen or $C_1$–$C_{10}$ alkyl, and pair of adjacent radicals $R^3$, $R^4$, $R^5$, and $R^6$ can form an aromatic ring with the C-atoms to which they are bonded, and $R^7$ is preferably —Si(CH$_3$)$_2$—Si(CH$_3$)$_2$—.

13 Claims, No Drawings

POLYMER HAVING LONG ISOTACTIC SEQUENCES AND RANDOMLY-DISTRIBUTED ETHYLENE CONTENT OBTAINED BY POLYMERIZING PROPYLENE IN PRESENCE OF SPECIFIC CATALYSTS

CROSS REFERENCE TO RELATED APPLICATIONS

This application is a continuation of Ser. No. 08/192,837, now abandoned, which is a continuation-in part of our application Ser. No. 07/978,022, filed Nov. 18, 1992, now abandoned, which was a continuation of application Ser. No. 07/387,218, filed Jul. 28, 1989, now abandoned.

FIELD OF THE INVENTION

This invention relates to polymers obtained by polymerizing propylene in the presence of a catalyst comprising a metallocene and an aluminoxane, the metallocene having been selected to provide a polypropylene of novel structure.

DESCRIPTION OF THE PRIOR ART

It is known that polypropylene exists in various structural isomers:

(a) highly isotactic polypropylene in whose molecular chains almost all tertiary C atoms have the same configuration, (b) isotactic stereoblock PP in whose molecular chains isotactic blocks of opposite configuration alternate regularly with one another, (c) syndiotactic polypropylene in whose molecular chains every other tertiary C atom has the same configuration, (d) atactic polypropylene in whose molecular chains the tertiary C atoms have a random configuration, and (e) atactic-isotactic stereoblock PP in whose molecular chains isotactic and atactic blocks alternate with one another.

A process for the manufacture of isotactic stereoblock polymers is known in which propylene is polymerized with the aid of a metallocene of a metal of group IVb, Vb or VIb of the periodic table (q.v. U.S. Pat. No. 4,522,982). This metallocene is a mono-, di- or tri-cyclopentadienyl or substituted cyclopentadienyl compound of a metal, especially titanium. An aluminoxane is used as cocatalyst.

However, the titanocenes which are preferably used do not have sufficient heat stability in dilute solution to be usable in an industrial process. Moreover, in this process, products with longer isotactic sequences (n greater than 6) are only obtained at very low temperature (−60° C.). Finally, the cocatalysts must be used in comparatively high concentration in order to achieve an adequate catalytic yield, so the catalyst residues contained in the polymer product have to be removed in a separate purification step.

It is further known that stereoblock polymers of 1-olefins with long isotactic sequences can be obtained at industrially favorable polymerization temperatures by means of a catalyst consisting of a metallocene compound with cyclopentadienyl radicals substituted by chiral groups, and of an aluminoxane (q.v. European patent application A 269987).

It if further known that stereoblock polymers of 1-olefins with a broad monomodal or multimodal molecular weight distribution can be obtained when 1-olefins are polymerized using a catalyst consisting of a chiral metallocene containing bridges and of an aluminoxane (q.v. European patent application A 269986). The polymers are particularly suitable for the production of transparent sheets.

It is also known that when a catalyst based on bis-cyclopentadienyl compounds of zirconium and on an aluminoxane is used in the polymerization of propylene, only atactic polymer is obtained (q.v. European patent application A 69951).

Finally, highly isotactic polypropylene can be manufactured by means of soluble stereorigid chiral zirconium compounds (q.v. European patent application A 185 918).

SUMMARY OF THE INVENTION

A polymerization process has been found in which a polymer of regular molecular structure and high molecular weight is obtained in high yield at industrially favorable process temperatures.

The invention relates to an "isoblock" polymer of propylene, i.e. a polymer of propylene with molecular chains containing isotactic sequences which are separated from one another by one monomer unit of opposite configuration, and 0.5 to 10 mol %, based on the total polymer, of randomly distributed ethylene content, the ethylene content consisting essentially of units of the formula —(CH$_2$)$_4$—. The isotactic sequences are 3 to 50 monomer units in length. Although the "isoblock" polymer has at least 0.5 mol % randomly-distributed —(CH$_2$)$_4$— units, it is derived essentially only from propylene.

The invention further relates to a process for the manufacture of "isoblock" polymers by the polymerization of propylene at a temperature of −60° to 100° C. and a pressure of 0.5 bar, in solution, in suspension or in the gas phase, in the presence of a catalyst comprising a metallocene and an aluminoxane, wherein the metallocene is a compound of formula I:

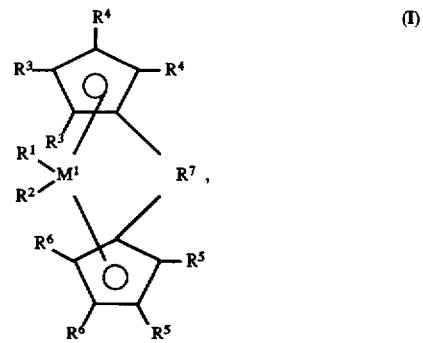

in which

M$^1$ is a metal of Group IVb of the Periodic Table, preferably hafnium or zirconium, R$^1$ and R$^2$ are preferably identical and are preferably halogen atoms, R$^3$, R$^4$, R$^5$ and R$^6$ are hydrogen atoms or C$_1$–C$_{10}$-alkyl groups, and pairs of adjacent radicals R$^3$, R$^4$, R$^5$ and R$^6$ can from an aromatic ring with the C-atoms to which they are bonded, and R$^7$ is —M$^2$(R$^9$)(R$^{10}$)—M$^2$(R$^9$)(R$^{10}$)—, in which R$^9$ and R$^{10}$ are preferably identical and are C$_1$–C$_{10}$-alkyl groups, and M$^2$ is silicon, germanium or tin, preferably silicon.

Particularly preferred metallocenes are the bis(indenyl) bis(di-C$_1$–C$_4$-alkylsilyl)metal di-halides, where the metal is from Group IVb of the Periodic Table, preferably zirconium or hafnium.

DETAILED DESCRIPTION

An "isoblock" polymer of this invention is a propylene polymer, even though it contains 0.5 to 10 mol %, based on the total polymer, of randomly distributed ethylene content.

The molecular chains of this polymer contain isotactic sequences which are separated from one another in each case by one monomer unit of opposite configuration. The molecular chains preferably comprise isotactic sequences which are separated from one another in each case by one monomer unit of opposite configuration. The isotactic sequences have a length of 3 to 50 monomer units. The molecular chains simultaneously contain randomly distributed ethylene units which are preferably located in the isotactic sequences and have been formed by the rearrangement of propylene during polymerization. The ethylene units can be detected by $^{13}C$ NMR spectroscopy (q.v. Soga et al., Makrom. Chem. Rap Comm. 8, 305–310 (1987)). They are in an amount of 0.5 to 10, preferably 3 to 5 mol %, based on the total polymer.

As a consequence of this steric structure, the isoblock polymers according to the invention are amorphous or partly crystalline according to the molecular weight and the length of the isotactic sequences. Depending on the crystallinity, the polymers are obtained as granular powders or as compact masses. The partly crystalline isoblock polymers have a low melting point by comparison with isotactic polymers. Isoblock polymers possess rubber-like properties.

The catalyst to be used for the process according to the invention consists of a metallocene compound of formula I and an aluminoxane. In formula I:

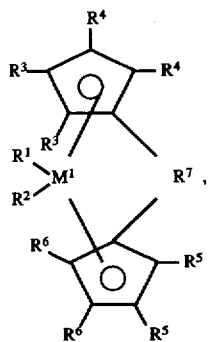
(I)

$M^1$ is a metal of group IVb, of the periodic table, preferably zirconium or hafnium, $R^1$ and $R^2$ are preferably identical and are preferably halogen, especially chlorine, $R^3$, $R^4$, $R^5$ and $R^6$ are hydrogen atoms, or $C_1-C_{10}$-, preferably $C_1-C_3$-alkyl groups, and pairs of adjacent radicals $R^3$, $R^4$, $R^5$ and $R^6$ can form an aromatic ring with the C atoms to which they are bonded.

$R^7$ is $-M^2(R^9)(R^{10})-M^2(R^9R^{10})-$ in which $R^9$ and $R^{10}$ are preferably identical and are $C_1-C_{10}$-alkyl groups, preferably $C_1-C_4$-alkyl groups and especially methyl groups, $M^2$ is Si, Ge or Sn, preferably Si $R^7$ is preferably $-Si(R^9)(R^{10})-Si(R^9)(R^{10})-$.

The metallocenes described above can be prepared according to the following reaction scheme:

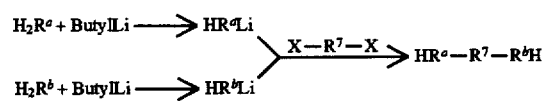

$(X = Cl, Br, I, O\text{-Tosyl}, HR^a =$ 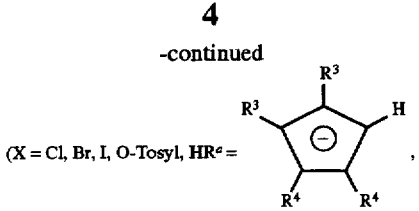, $HR^b =$ 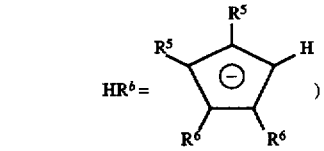 )

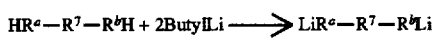

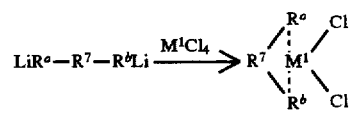

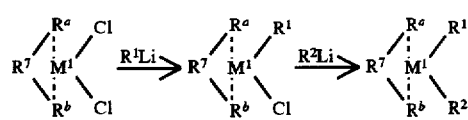

It is especially preferred to use his (indenyl) his (dimethylsilyl)hafnium dichloride (=1) and his (indenyl) bis-(dimethylsilyl)zirconium dichloride (=2) as the metallocene compounds.

The activator is an aluminoxane of formula (II):

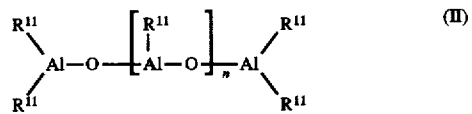
(II)

for the linear type and/or of formula (III):

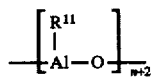

for the cyclic type. In these formulae, $R^{11}$ is a $C_1-C_6$-alkyl group, preferably methyl, ethyl or isobutyl, in particular methyl, and n is an integer from 2 to 50, preferably 10 to 40. The exact structure of the aluminoxane is not certain, however, so formulae II and III are only approximate formulae.

The aluminoxane can be prepared in a variety of ways.

One possibility is carefully to add water to a dilute solution of an aluminum trialkyl, the aluminum trialkyl solution and the water each being introduced in small portions into a larger amount of an inert solvent and the evolution of gas being allowed to finish between successive additions.

In another process, finely powdered copper sulfate, pentahydrate is suspended in toluene and, in a glass flask, aluminum trialkyl is added, under inert gas at about −20° C., in an amount such that about 1 mol of $CuSO_4.5H_2O$ is available for every 4 Al atoms. After slow hydrolysis with the elimination of alkane, the reaction mixture is left for 24 to 48 hours at room temperature, during which time it must be cooled, if necessary, to prevent the temperature from rising above 30° C. The aluminoxane dissolved in the toluene is then isolated from the copper sulfate by filtration and the solution is concentrated under vacuum. It is assumed that, in this preparative process, the low-molecular aluminoxanes condense to form higher-molecular oligomers with the elimination of aluminum trialkyl.

Furthermore, aluminoxanes are obtained when aluminum trialkyl, preferably aluminum trimethyl, dissolved in an inert aliphatic or aromatic solvent, preferably heptane or toluene, is reacted, at a temperature of $-20°$ to $100°$ C., with aluminum salts containing water of crystallization, preferably aluminum sulfate. The volume ratio of solvent to aluminum alkyl used is 1:1 to 50:1—preferably 5:1—and the reaction time, which can be monitored by means of the alkane eliminated, is 1 to 200 hours—preferably 10 to 40 hours.

Aluminum salts containing water of crystallization which are used in particular are those with a high content of water of crystallization. Aluminum sulfate hydrates are especially preferred, in particular the compounds $Al_2(SO_4)_3 \cdot 16H_2O$ and $Al_2(SO_4)_3 \cdot 18H_2O$ with the especially high contents of water of crystallization of 16 and 18 mol of $H_2O$/mol of $Al_2(SO_4)_3$ respectively.

Another variant for the preparation of aluminoxanes consists in dissolving aluminum trialkyl, preferably aluminum trimethyl, in the suspending agent, preferably in the liquid monomer or in heptane or toluene, previously placed in the polymerization kettle, and then reacting the aluminum compound with water.

There are other processes for the preparation of aluminoxanes which can be used in addition to those described above.

Before it is used in the polymerization reaction, the metallocene can be preactivated with an aluminoxane of formula (II) and/or (III), which markedly increases the polymerization activity.

The preactivation of the transition metal compound is carried out in solution, the metallocene preferably being dissolved in a solution of the aluminoxane in an inert hydrocarbon. An aliphatic or aromatic hydrocarbon is suitable for this purpose. Toluene is preferably used.

The concentration of the aluminoxane in the solution is in the range from approx. 1% by weight to the saturation limit, preferably from 5 to 30% by weight, based in each case on the total solution. The metallocene can be used in the same concentration, although it is preferably used in an amount of $10^{-4}-1$ mol per mol of aluminoxane. The preactivation time is 5 minutes to 60 hours, preferably 5 to 60 minutes. The reaction temperature is $-78°$ C. to $100°$ C., preferably $0°$ to $70°$ C.

The catalyst to be used according to the invention is employed for the polymerization of 1-olefins of the formula $R$—$CH$=$CH_2$, in which R is an alkyl radical having 1 to 28 C atoms, preferably 1 to 10 C atoms, in particular one C atom, for example propylene, but-1-ene, hex-1-ene, 4-methylpent-1-ene or oct-1-ene. Propylene is especially preferred.

The polymerization is carried out in a known manner in solution, in suspension or in the gas phase, continuously or batchwise, in one or more steps, at a temperature of $-60°$ to $100°$ C., preferably $0°$ to $80°$ C. The pressure is 0.5 to 100 bar. Polymerization preferably takes place in the pressure range from 5 to 60 bar, which is of particular interest to industry.

The metallocene compound is used in a concentration of $10^{-3}$ to $10^{-7}$, preferably $10^{-4}$ to $10^{-6}$ mol of transition metal per $dm^3$ of solvent or per $dm^3$ of reactor volume. The aluminoxane is used in a concentration of $10^{-4}$ to $10^{-1}$ mol, preferably $10^{-3}$ to $10^{-2}$ mol per $dm^3$ of solvent or per $dm^3$ of reactor volume. In principle, however, higher concentrations are also possible.

If the polymerization is carried out in suspension or solution, the reaction is performed in an inert solvent conventionally used for the Ziegler low-pressure process, for example in an aliphatic or cycloaliphatic hydrocarbon; examples of such hydrocarbons which may be mentioned are butane, pentane, hexane, hepotane, isoctane, cyclohexane and methylcyclohexane. It is also possible to use a naphtha or hydrogenated diesel oil fraction from which oxygen, sulfur compounds and moisture have been carefully removed. Toluene can also be used. Preferably, the monomer to be polymerized is used as the solvent or suspending agent. The molecular weight of the polymer can be regulated in a known manner, hydrogen preferably being used for this purpose. The polymerization time is arbitrary since the time-dependent loss of polymerization activity shown by the catalyst system to be used according to the invention is only slight.

The process according to the invention is distinguished by the fact that the zirconium and hafnium compounds which are preferably used are very temperature-resistant, so they can also be used at temperatures up to $90°$ C. Moreover, the aluminoxanes used as cocatalysts can be added in a smaller concentration then hitherto. Finally, it is now possible to manufacture isoblock polymers at temperatures which are of interest to industry.

The following Examples will serve to illustrate the invention. The abbreviations used have the meanings given below:

VN=viscosity number in $cm^3/g$,

Mw=weight-average molecular weight in g/mol,

Mw/Mn=molecular weight distribution determined by gel permeation chromatography (GPC), II=isotacticity index determined by $^{13}C$ NMR spectroscopy, and $n_{iso}$=average length of the isotactic sequences.

Isoblock polymers can be detected and distinguished from other 1-olefin polymers by NMR spectroscopy with the aid of triple resonance analysis (q.v. A. Zambelli et al., Macromolecules 8, 687–689 (1975)). Markoff statistics are valid for isoblock polymers if the following equation is satisfied:

$$2(rr)/(mr)=1$$

The ethylene content was determined by NMR and IR spectroscopy.

EXAMPLE 1

A dry 16 $dm^3$ kettle was flushed with nitrogen and filled with 10 $dm^3$ of liquid propylene. 40 $cm^3$ of a toluene solution of methylaluminoxane (=MAO, corresponding to 26.8 mmol of Al, average degree of oligomerization n=30) were then added and the reaction mixture was stirred at $30°$ C. for 15 minutes.

In a parallel procedure, 47.9 mg (0.088 mmol) of bis-(indenyl)bis(dimethylsilyl)zirconium dichloride were dissolved in 20 $cm^3$ of MAO (=13.4 mmol of Al) and preactivated by standing for 15 minutes. The solution was then introduced into the kettle. The polymerization system was brought to a temperature of $70°$ C. and then kept for 5 hours at this temperature.

1.62 kg if isoblock polymer were obtained. The activity of the metallocene was therefore 6.8 kg of polymer/g of metallocene/h.

The following analytical data were determined on the polymer: VN=14 $cm^3/g$, Mw=9000, Mn=4750, Mw/Mn= 1.9, II=73.6%, $n_{iso}$=5.8, C (—$(CH_2)_4$—)=4.71 mol %.

EXAMPLE 2

The procedure was analogous to that in Example 1 except that 60° C. was selected as the polymerization temperature. The polymerization time was 5 hours. 100.0 mg of metallocene compound were used. 0.87 kg of isoblock polymer was obtained. The activity of the metallocene was therefore 1.7 kg of polymer/g of metallocene/h. The following analytical data were determined on the polymer: VN=17 cm$^3$/g, Mw=10,200, Mn=5700, Mw/Mn=1.8, II=74.3%, n$_{iso}$=6.0, C (—(CH$_2$)$_4$—)=3.65 mol %.

EXAMPLE 3

The procedure was analogous to that in Example 1 except that 50° C. was selected as the polymerization temperature. The polymerization time was 25 hours. 54.8 mg of metallocene compound were used in the approximate amount of MAO. 0.46 kg of isoblock polymer was obtained. The activity of the metallocene was therefore 1.67 kg of polymer/g of metallocene/h. The following analytical data were determined on the polymer: VN=21 cm$^3$/g, Mw=11,900, Mn=6300, Mw/Mn=1.9, II=75.1%, n$_{iso}$=6.4, C (—(CH$_2$)$_4$—)=2.71 mol %.

EXAMPLE 4

The procedure was analogous to that in Example 1 except that 40° C. was selected as the polymerization temperature. The polymerization time was 5 hours. 44.7 mg of metallocene compound were used. 0.14 kg of isoblock polymer was obtained. The activity of the metallocene was therefore 0.63 kg of polymer/g of metallocene/h. The following analytical data were determined on the polymer: VN=9 cm$^3$/g, Mw=12,400, Mn=6200, Mw/Mn=2.0, II=76.4%, n$_{iso}$=6.5, C (—(CH$_2$)$_4$—)=1.4 mol %.

EXAMPLE 5

The procedure was analogous to that in Example 1 except that 10° C. was selected as the polymerization temperature. The polymerization time was 12 hours. 180.0 mg of metallocene compound were used. 0.17 kg of isoblock polymer was obtained. The activity of the metallocene was 0.08 kg of polymer/g of metallocene/h. The following analytical data were determined on the polymer: VN=58 cm$^3$/g, Mw=48,600, Mn=23,800, Mw/Mn=2.0, II=81.0%, n$_{iso}$=8.4, C (—(CH$_2$)$_4$—)=0.5 mol %.

EXAMPLE 6

The procedure was analogous to that in Example 1 except that bis(indenyl)bis (dimethylsilyl)hafnium dichloride, in an amount of 5.0 mg (=0.013 mmol), was selected as the metallocene compound (the metallocene was dissolved in 20 cm$^3$ of MAO (=13.4 mmol of Al), and 40 cm$^3$ of MAO (=26.8 mmol of Al) were added to the liquid propylene).

The polymerization system was brought to a temperature of 60° C. and then kept for 5 hours at this temperature. 0.73 kg of isoblock polymer was obtained. The activity of the metallocene was therefore 6.75 kg of polymer/g of metallocene/h. The following analytical data were determined on the polymer: VN=59 cm$^3$/g, II=77.5%, n$_{iso}$=7.1, C(—(CH$_2$)$_4$—)=2.38 mol %.

COMPARATIVE EXAMPLE

In an experiment analogous to Example 1, a polymer with a VN of 43.5 cm$^3$/g, an Mw of 35,200 and an Mw/Mn of 2.5 was obtained with rac-bis(indenyl)(dimethylsilyl)zirconium dichloride. The isotacticity index was 96.6% and the length of the isotactic sequences was found to be 51.

What is claimed is:

1. An isoblock polymer of propylene with molecular chains containing isotactic sequences which are separated from one another in each case by one monomer unit of opposite configuration, and 0.5 to 10 mol %, based on the total polymer, of randomly distributed units consisting essentially of units of the formula —(CH$_2$)$_4$—, said isotactic sequences being 3 to 50 monomer units in length.

2. The isoblock polymer according to claim 1, with molecular chains consisting essentially of isotactic sequences which are separated from one another in each case by one monomer unit of opposite configuration, and containing 0.5 to 10 mol %, based on the total polymer, of randomly distributed units consisting: essentially of units of the formula —(CH$_2$)$_4$—, said isoblock polymer having been prepared by polymerizing propylene in the presence of a catalyst comprising a metallocene and an aluminoxane, wherein the metallocene is a bis(indenyl)bis(di-C$_1$-C$_4$-alkylsilyl)metal dihalide, the metal of said bis(indenyl)bis (di-C$_1$-C$_4$-alkylsilyl)metal dihalide being a metal of Group IVb of the Periodic Table.

3. The isoblock polymer according to claim 2, wherein said metallocene is bis(indenyl)bis(dimethylsilyl)hafnium dichloride or bis(indenyl)bis(dimethylsilyl)-zirconium dichloride.

4. A polymer mixture comprising an isoblock polymer according to claim 1.

5. A polymer mixture according to claim 4, wherein the polymer mixture is a polypropylene blend.

6. A polymer of propylene having a structure containing 0.5 to 10 mol %, based the weight of the polymer, of randomly distributed units consisting essentially of propylene-derived units of the formula —(CH$_4$)$_2$—, said isoblock structure being essentially free of syndiotactic and atactic polypropylene chains and the molecular chains of the isoblock polymer consisting essentially of isotactic sequences of 3 to 50 monomer units separated from one another in each ease by one monomer unit of opposite configuration, said polymer of propylene being amorphous or partially crystalline, and, if partially crystalline, having a melting point lower than that of an isotactic polypropylene.

7. The polymer of propylene according to claim 6, wherein said polymer has been prepared by polymerizing propylene in the presence of a catalyst comprising a metallocene and an aluminoxane, said metallocene being a bis (indenyl)bis(di-C$_1$-C$_4$-alkylsilyl)metal dihalide, the metal of said bis(indenyl)bis(di-C$_1$-C$_4$-alkylsilyl)metal dihalide being a metal of Group IVb of the Periodic Table.

8. The polymer of propylene according to claim 7, wherein said metallocene is bis(indenyl)bis(dimethylsilyl) hafnium dichloride or bis(indenyl)bis(dimethylsilyl) zirconium dichloride.

9. A polymerized propylene polymer having 0.5 to 10 mol %, based on the total polymer, of randomly-distributed, propylene-derived —(—CH$_2$—)$_4$— units, said polymer consisting essentially of isotactic polymerized propylene sequences 3 to 50 monomer units in length, said polymerized propylene sequences being separated from one another by one propylene unit of opposite configuration.

10. The polymerized propylene polymer according to claim 9, wherein said polymer has been prepared by polymerizing propylene in the presence of a catalyst comprising a metallocene and an aluminoxane, said metallocene being a bis(indenyl)bis(di-C$_1$-C$_4$-alkylsilyl)metal dihalide, the metal of said bis(indenyl)bis(di-C$_1$-C$_4$-alkylsilyl)metal dihalide being a metal of Group IVb of the Periodic Table.

11. The polymer of propylene according to claim 10, wherein said metallocene is bis(indenyl)bis(dimethylsilyl) hafnium dichloride or bis(indenyl)bis(dimethylsilyl) zirconium dichloride.

12. The polymer of propylene according to claim 11, wherein said metallocene is bis(indenyl)bis(dimethylsilyl) hafnium dichloride.

13. The polymer as claimed in claim 11, wherein said metallocene is bis(indenyl)bis(dimethylsilyl)zirconium dichloride.

* * * * *